US006569013B1

(12) United States Patent
Taylor

(10) Patent No.: US 6,569,013 B1
(45) Date of Patent: May 27, 2003

(54) METHOD FOR PLAYING A VIDEO GAMING MACHINE

(76) Inventor: William Arthur Taylor, 1326 Aspen Dr., Evergreen, CO (US) 80439

(*) Notice: Subject to any disclaimer, the term of this patent is extended or adjusted under 35 U.S.C. 154(b) by 0 days.

(21) Appl. No.: 09/903,546

(22) Filed: Jul. 12, 2001

Related U.S. Application Data

(60) Provisional application No. 60/218,299, filed on Jul. 14, 2000.

(51) Int. Cl.[7] .............................. A63F 13/00; A63F 9/20

(52) U.S. Cl. ............................ 463/13; 463/20; 273/292

(58) Field of Search .............................. 463/13, 20, 25; 273/292, 138.1, 138.2

(56) References Cited

U.S. PATENT DOCUMENTS 5,019,973 A * 5/1991 Wilcox et al. ................ 463/13
5,356,140 A * 10/1994 Dabrowski et al. ......... 273/292
6,179,711 B1 * 1/2001 Yoseloff .................. 273/138.1

* cited by examiner

*Primary Examiner*—Chen Wen Jiang

(57) ABSTRACT

A method for playing video gambling games whereby pay tables vary from play to play, or, alternatively, whereby a plurality of pay tables are possible within a game. For example, in a video poker game a player wagers against a first pay table. If a winner occurs, the next game offers a new pay table with a greater expected value. This process continues until the player loses, whereupon the player is returned to play against the first pay table. Pay tables increment and decrement in expected value based on achieving predetermined events within the current game, within a previous game or games or randomly.

20 Claims, 5 Drawing Sheets

| PAYTABLE | Successive Games | | | | | | | | | |
|---|---|---|---|---|---|---|---|---|---|---|
| **Final Hand** | Game 1 Pays | Game 2 Pays | Game 3 Pays | Game 4 Pays | Game 5 Pays | Game 6 Pays | Game 7 Pays | Game 8 Pays | Game 9 Pays | Game 10 Pays |
| Royal Flush | 600 | 650 | 700 | 750 | 800 | 850 | 900 | 950 | 1000 | 2500 |
| Straight Flush | 50 | 55 | 60 | 65 | 70 | 75 | 80 | 85 | 90 | 500 |
| Four of a Kind | 20 | 25 | 30 | 35 | 40 | 45 | 50 | 55 | 60 | 100 |
| Full House | 7 | 8 | 9 | 10 | 11 | 12 | 13 | 14 | 15 | 50 |
| Flush | 5 | 6 | 7 | 8 | 9 | 10 | 11 | 12 | 13 | 50 |
| Straight | 4 | 5 | 6 | 7 | 8 | 9 | 10 | 11 | 12 | 25 |
| Three of a Kind | 3 | 4 | 5 | 6 | 7 | 8 | 9 | 10 | 11 | 20 |
| Two Pair | 2 | 3 | 4 | 5 | 6 | 7 | 8 | 9 | 10 | 15 |
| Pair of Jacks or Better | 1 | 1 | 1 | 1 | 1 | 1 | 1 | 1 | 1 | 10 |
| Pair of Tens or Less | 0 | 0 | 0 | 0 | 0 | 0 | 0 | 0 | 0 | 5 |

| PAYTABLE | *Successive Games* | | | | |
|---|---|---|---|---|---|
| Final Hand | Game 1 Pays | Game 2 Pays | Game 3 Pays | Game 4 Pays | Game 5 Pays |
| Royal Flush | 600 | 650 | 700 | 750 | 600 |
| Straight Flush | 50 | 55 | 60 | 65 | 50 |
| Four of a Kind | 20 | 25 | 30 | 35 | 20 |
| Full House | 7 | 8 | 9 | 10 | 7 |
| Flush | 5 | 6 | 7 | 8 | 5 |
| Straight | 4 | 5 | 6 | 7 | 4 |
| Three of a Kind | 3 | 4 | 5 | 6 | 3 |
| Two Pair | 2 | 3 | 4 | 5 | 2 |
| Pair of Jacks or Better | 1 | 1 | 1 | 1 | 1 |
| Pair of Tens or Less | 0 | 0 | 0 | 0 | 0 |

FIG. 1

| PAYTABLE | *Successive Games* | | | | | | | | | |
|---|---|---|---|---|---|---|---|---|---|---|
| **Final Hand** | Game 1 Pays | Game 2 Pays | Game 3 Pays | Game 4 Pays | Game 5 Pays | Game 6 Pays | Game 7 Pays | Game 8 Pays | Game 9 Pays | Game 10 Pays |
| Royal Flush | 600 | 650 | 700 | 750 | 800 | 850 | 900 | 950 | 1000 | 2500 |
| Straight Flush | 50 | 55 | 60 | 65 | 70 | 75 | 80 | 85 | 90 | 500 |
| Four of a Kind | 20 | 25 | 30 | 35 | 40 | 45 | 50 | 55 | 60 | 100 |
| Full House | 7 | 8 | 9 | 10 | 11 | 12 | 13 | 14 | 15 | 50 |
| Flush | 5 | 6 | 7 | 8 | 9 | 10 | 11 | 12 | 13 | 50 |
| Straight | 4 | 5 | 6 | 7 | 8 | 9 | 10 | 11 | 12 | 25 |
| Three of a Kind | 3 | 4 | 5 | 6 | 7 | 8 | 9 | 10 | 11 | 20 |
| Two Pair | 2 | 3 | 4 | 5 | 6 | 7 | 8 | 9 | 10 | 15 |
| Pair of Jacks or Better | 1 | 1 | 1 | 1 | 1 | 1 | 1 | 1 | 1 | 10 |
| Pair of Tens or Less | 0 | 0 | 0 | 0 | 0 | 0 | 0 | 0 | 0 | 5 |

FIG. 2

| PAYTABLE | *Successive Games* | | | | |
|---|---|---|---|---|---|
| Final Hand | Game 1 Pays | Game 2 Pays | Game 3 Pays | Game 4 Pays | Game 5 Pays |
| Royal Flush | 600 | 500 | 2500 | 500 | 800 |
| Straight Flush | 50 | 50 | 500 | 500 | 50 |
| Four of a Kind | 20 | 50 | 25 | 1000 | 20 |
| Full House | 7 | 50 | 10 | 9 | 7 |
| Flush | 5 | 10 | 8 | 8 | 5 |
| Straight | 4 | 8 | 6 | 25 | 4 |
| Three of a Kind | 3 | 6 | 4 | 6 | 3 |
| Two Pair | 2 | 4 | 2 | 5 | 2 |
| Pair of Jacks or Better | 1 | 2 | 2 | 1 | 1 |
| Pair of Tens or Less | 0 | 0 | 2 | 0 | 0 |

FIG. 3

| PAYTABLE | | | *Successive Games* | | |
|---|---|---|---|---|---|
| Final Hand | Game 1 Pays | Game 2 Pays | Game 3 Pays | Game 4 Pays | Game 5 Pays |
| Royal Flush | 600 | 500 | 2500 | 500 | 800 |
| Straight Flush | 50 | 50 | 500 | 500 | 50 |
| Four 2s, 3s or 4s | 100 | 100 | 25 | 1000 | 20 |
| Four 5s through Aces | 50 | 75 | 100 | 500 | 20 |
| Full House | 7 | 50 | 10 | 9 | 7 |
| Flush | 5 | 10 | 8 | 8 | 5 |
| Straight | 4 | 8 | 6 | 25 | 4 |
| Three of a Kind | 3 | 6 | 4 | 6 | 3 |
| Two Pair | 2 | 4 | 2 | 5 | 2 |
| Pair of Eights or Better | 1 | 2 | 2 | 1 | 1 |
| Pair of Sevens or Less | 0 | 0 | 2 | 0 | 0 |

FIG. 4

| PAYTABLE | *Successive Games* | | | | | | | | | |
|---|---|---|---|---|---|---|---|---|---|---|
| **Final Hand** | Game 1 Pays | Game 2 Pays | Game 3 Pays | Game 4 Pays | Game 5 Pays | Game 6 Pays | Game 7 Pays | Game 8 Pays | Game 9 Pays | Game 10 Pays |
| Royal Flush | 600 | 650 | 700 | 700 | 700 | 650 | 650 | 600 | 650 | 650 |
| Straight Flush | 50 | 55 | 60 | 60 | 60 | 55 | 55 | 50 | 55 | 55 |
| Four of a Kind | 20 | 25 | 30 | 30 | 30 | 25 | 25 | 20 | 25 | 25 |
| Full House | 7 | 8 | 9 | 9 | 9 | 8 | 8 | 7 | 8 | 8 |
| Flush | 5 | 6 | 7 | 7 | 7 | 6 | 6 | 5 | 6 | 6 |
| Straight | 4 | 5 | 6 | 6 | 6 | 5 | 5 | 4 | 5 | 5 |
| Three of a Kind | 3 | 4 | 5 | 5 | 5 | 4 | 4 | 3 | 4 | 4 |
| Two Pair | 2 | 3 | 4 | 4 | 4 | 3 | 3 | 2 | 3 | 3 |
| Pair of Jacks or Better | 1 | 1 | 1 | 1 | 1 | 1 | 1 | 1 | 1 | 1 |
| Pair of Tens or Less | 0 | 0 | 0 | 0 | 0 | 0 | 0 | 0 | 0 | 0 |

FIG. 5

METHOD FOR PLAYING A VIDEO GAMING MACHINE

This application claims the benefit of Prov. application No. 60/218,299 filed Jul. 14, 2000.

BACKGROUND—FIELD OF INVENTION

The invention relates to gaming machines generally, and in particular to methods of play and pays for a video gambling machine.

BACKGROUND—DISCUSSION OF PRIOR ART

One of the most common gambling devices in use today is the slot machine. Originally, slot machines were mechanical and had 3 or 4 independent reels side-by-side. Each reel had several symbols painted on it. Inserting a coin and pulling a large spring-loaded handle set the reels spinning independently, and when the same symbols landed in a row across the reels, a winner occurred and coins were released from the machine.

Today, many new slot machines are in video form. Video slots are becoming more and more popular with players. The video platform offers more flexibility in game development and results in more complicated and more involving and entertaining games. These new video slots are controlled by an internal computer. They usually don't have a large handle anymore, and some don't even have buttons, using touchscreen panels to make player choices instead.

The video slot machine usually consists of a cabinet built mostly of metal and plastic that houses many different internal components. The basic functions are coin acceptance, game play and coin dispensing, although it is becoming increasingly common for slot machines to accept and pay back in currency or coupons instead of, or in addition to coins.

Coin acceptance is most often done by means of a coin head where coins are inserted into the game. A coin chute directs the coin into an internal coin hopper, if equipped, or into a removable drop bucket beneath the machine when the hopper is full. Winners may be paid back to players from the coin hopper through a small chute where coins land in a special tray where they are available to the player. Again, bill acceptors common today may accept and payout in currency or coupons in addition to or instead of coins.

Internally, game play is managed by a central processor on a printed circuit board similar to that of a standard personal computer. CD-ROMs and proms (programmable read-only memory computer chips) are often used, too. A power supply provides the current, and the game is displayed back to the player on a video monitor. Buttons on the outside of the cabinet provide for player input, although sometimes touchscreen panels are affixed to the monitor and used in addition to, or instead of buttons. Other printed circuit boards perform auxiliary functions, and there are usually mechanical meters counting coins in and out. Too, there is internal lighting to make the game clearly noticeable, and external glass usually shows the rules of the game. Finally, games may be networked to each other to report game and player statistics to the accounting office, or to play special games that are somehow linked to each other in a variety of different configurations.

A traditional non-video slot machine equipped with mechanical reels is largely the same as a video slot, except that the video display is replaced with a mechanical spinning reel assembly. Some games in use today are hybrids and use both mechanical reels and a video display.

Newer video slots usually show 5 reels side-by-side that spin on a common axis instead of the traditional 3 or 4 mechanical reels. These newer video slots usually display 3 symbols on each of the 5 reels, for a total of display of 15 symbols. This creates a video display matrix of 3 rows by 5 columns. Sometimes the number of reels and symbols displayed differ. Some new video slots display 4 symbols on 4 reels, for a total of 16 symbols. Others have independent reels showing just 1 position of each reel.

Displaying more symbols allows more wagering opportunities. Instead of a single paying row across the reels, there are often many different pay lines that can be wagered on. Usually, these pay lines run in different paths through each of 5 reels displayed. Players select which pay lines to wager on, they wager 1 or more credits per pay line and they may win on more than 1 pay line after a single spin of the reels.

Another popular feature of video slot machines is the use of bonus screens. Certain symbols trigger a bonus game that is often called a "second screen" game. The second screen game is usually separate and distinct from the normal video reel display, and a player might select a car in a car race or scratch from a selection of video lottery tickets in an attempt to win credits, free games or anything of value. Some games even offer third screens or more, enhancing player interest and intrigue. After the bonus game, the player is usually returned to the normal video reel display and winnings, if any, are posted to the player's onscreen credit meter for subsequent play or cashout.

Another popular form of video slot machine is the video poker machine. Instead of a video representation of a slot machine, video poker cards are dealt randomly and displayed onscreen. Usually 5 cards are dealt from a video representation of a common playing card deck of 52 cards and the player, using physical buttons, touchscreen or similar device, selects which cards to hold and which cards to discard, if any. A player may discard from 0 to all 5 cards. Then, the player draws from 0 to 5 new cards from the 47 cards remaining in the original deck, replacing any discards in an attempt to better the hand. This hand is compared to a predefined pay table which determines the amount of the win if a win or a loss. This game is commonly known as draw poker.

The pay table was developed as a way to pay players when there are no opponents. These games are sometimes called "house banked" games, since the house (casino or gambling operator) pays players for winning. Alternatively, they are sometimes called "player's hand only" games, since it is usually only the player's hand that is relevant. Winnings do not come directly from other losing players, as in normal card games. The pay table is a fixed, predefined schedule of pays for hands designated as winners.

A typical pay table for video draw poker machines looks like this. (Pays shown are returns for 1 coin wagered):

TABLE 1

Common Video Poker Pay Table

| Hand | Pay |
|---|---|
| Royal Flush | 800 |
| Straight Flush | 50 |
| Four of a Kind | 25 |
| Full House | 9 |
| Flush | 6 |
| Straight | 4 |
| Three of a Kind | 3 |

TABLE 1-continued

Common Video Poker Pay Table

| Hand | Pay |
|---|---|
| Two Pairs | 2 |
| Pair of Jacks (or Better) | 1 |
| Pair of Tens or Less | 0 |

The hand is compared to the pay table to see if a win occurs, and if so, how much it pays. The pay amount is then multiplied times the number of coins or credits wagered, usually from 1 to 5, to determine the amount of the win, if any. If 5 coins are bet, for example, and a royal flush is obtained, then 4000 coins are paid to the player (5×800=4000). Note that one credit is equal to one coin, and that these terms are used interchangeably herein.

The pay table defines the game objectives for the player in terms of a monetary reward or payback. The payback for each hand can be multiplied by its expected frequency of occurrence to derive an overall game payback percentage for the player. Since strategy is an integral part of the game, that is deciding which cards to hold and which to discard, an optimal strategy is usually used to determine an optimal game payback. An optimal strategy employs the best draw decisions for every possible hand dealt. Since perfect play is rare, an expected payback is usually also found that accounts for sub-optimal play due to human error or incorrect decision making.

In the example shown in Table 1, the expected payback would be found by multiplying a winning hand pay by the % frequency to arrive at an expected value. The expected values of each pay are then summed to arrive at an overall expected value, or optimal payback, for the game overall.

TABLE 2

Finding the Optimal and Expected Payback

| Hand | Pay | % Frequency | Expected Value % |
|---|---|---|---|
| Royal Flush | 800 | 0.0028 | 2.8000 |
| Straight Flush | 50 | 0.0111 | 0.5550 |
| Four of a Kind | 25 | 0.2355 | 5.8875 |
| Full House | 9 | 1.1484 | 10.3356 |
| Flush | 6 | 1.1129 | 6.6774 |
| Straight | 4 | 1.1306 | 4.5224 |
| Three of a Kind | 3 | 7.4148 | 22.2444 |
| Two Pairs | 2 | 12.8898 | 25.7796 |
| Pair Jacks (or Better) | 1 | 21.2649 | 21.2649 |
| Pair of Tens or Less | 0 | 54.7892 | 0.0000 |
| Total | | 100.0000% | 100.0668% |

Note:
Optimal payback is 100.0668% with perfect play. Expected payback is 2.0% less due to sub optimal play, or 98.0668%.

It is important to point out the fixed nature of the pay table. Some games will accept bets of up to 100 coins or more, but the amount of the win is simply multiplied by the number of coins bet to determine the total pay. In our example above, but with a bet of 100 coins, the pay would be 8000 (100×800=8000).

Note that the pay table in Table 2 is somewhat atypical, since the optimal expected value exceeds 100.0%. Gambling operators usually rely on sub optimal play by players to assure they retain their mathematical advantage. At other times such a pay table is used for marketing so that operators can advertise greater than 100% paybacks, or as a shill game to generate activity in certain areas.

Since the pay table defines a player's objectives and rewards, some poker variants have been devised to better the pay table returns in an attempt to be more appealing to the player.

Some poker variations change only the pay table and are known by such names as bonus poker or double bonus poker. They still play by the same rules of draw poker and pay according to a single, fixed pay table. The common thread in these games is that the pays for individual hands vary from the normal ranking. Four deuces might offer a better pay than 4 kings, for example. The drawback of these games is that what is normally a greater hand pays less than what is normally a lesser hand. Another drawback is that any single, fixed pay table game can become boring after awhile.

Many offer a bonus for playing more coins. On the royal flush hand it is common to pay 250 for 1 if wagering from 1 to 4 coins, but 800 for 1 if betting the maximum 5 coins. One drawback of this game is that in order to accommodate the bonused hand pay, the pay table returns for the other winning hands are reduced. (This is required to retain a house advantage.)

Another variation of video poker includes a progressive jackpot pay. A progressive increases the pay for a given hand based on the amount that the game has been played until the progressive award is paid out, whereupon it is reset to its starting value. For example, many video poker machines have a progressive royal flush award. The pay for the royal flush might start out at the reset value of 800, but then increase at a typical rate of 1% of moneys wagered. Assuming that $1000 has been wagered since reset, then 1% ($10) is added to the pay for a royal flush so that 810 is the value on the pay table (shown on a mechanical meter or video display). Note this example assumes one credit or one coin is worth one dollar. (Poker games are offered in various denominations.) As soon as the royal flush is won and paid, its pay returns to its reset value, and it starts over, incrementing again based on the amount of money wagered.

Some video poker machines have multiple progressives. They may offer a progressive jackpot pay on 4-of-a-Kind and a Royal Flush hand, for example. It is also common to link several machines such that the total amount wagered on all machines contributes to the progressive pay. When it is won and paid on any machine on the link, the pay is restarted at the reset value on all linked machines. By linking multiple machines in this manner, the progressive usually increases much faster which builds player interest and excitement. One drawback of progressives, is that in the non-progressive portions of the pay table hand pays must be reduced to compensate for the additional percentage paybacks granted in the progressive hand wins to ensure the house advantage.

Double down stud, as described in U.S. Pat. No. 5,167,413, has no conventional draw. It does, however, permit a player to raise the bet in an attempt to receive a greater return. A drawback of this game is that is requires an additional wager to yield a greater return.

Triple play poker, as described in U.S. Pat. No. 5,823,873, allows held cards to be played as multiple hands and each drawn to independently, usually resulting in 3 different hands. Although each hand pays according to the single pay table, a drawback of this game is that to play each additional hand requires an additional wager.

The poker game described in U.S. Pat. No. 6,132,311 may include a bonus multiplier where obtaining a special symbol multiplies any winning payout by a fixed integer. This game also allows multiple hand play for a single wager. A drawback of this game is that the pay table must be reduced to compensate for the bonus multipliers and multiple hand winners, again to ensure the house retains its advantage. Another drawback is that multiplying any winning payout by a fixed integer does not allow for more subtle variations in the pay table returns.

The gaming device described in U.S. Pat. No. 6,234,897 may include a poker hand as a bonus feature on a traditional slot machine. One drawback of this game is that the poker pay table offered thereby (and the related expected value) is a function solely of the triggering base game outcome. Therefore, once triggered it becomes, in effect, a single fixed pay table.

A drawback of all fixed pay table games is that to be played optimally, they require the same strategy be employed. That is, once you know the correct strategy for a certain pay table, you play that strategy over and over again and the game eventually becomes boring, monotonous and routine.

Other video card games include rummy, where the pay table pays for runs and sets, video blackjack, other poker variations such as 7-card stud, and community card games such as Texas hold'em, Omaha and pai gow poker, for example.

Gambling operators try to offer the most entertaining and exciting gambling games possible to stimulate greater play and increase profits. A common theme in new games is the attempt to offer a greater return for a given wager in a manner that appeals to players. Since the house must retain its advantage, however, game designers are limited in what they can do and many new games result in a simple tit-for-tat exchange of pays within the pay table. That is, one hand pays more while another hand pays less. Due to the repetitive nature of traditional game play, operators' desires to increase play and the proliferation and acceptance of gambling worldwide, the need for new and exciting video card games is greater than ever. The present invention is directed to satisfying these needs.

OBJECTS AND ADVANTAGES

Accordingly, several objects and advantages of this invention are:

1. This invention provides variety. Variety is important, because players tire of the same old games. New games and features are exciting and lead to increased play and greater profits for gambling operators.
2. This invention may be applied to virtually all existing video gambling card games, making them more interesting and extending their life cycle!
3. This invention makes games more fun to play.
4. This invention adds player interest and depth, making games with this invention more involving for players. Variable pay tables require different strategies for optimal results.
5. This invention can be applied to existing or new games in innumerable ways. This inventions opens a whole new realm of possibilities for gambling device designers, developers and manufacturers. The number of pay tables can be extended infinitely. The number of paying hands within these pay tables can be adjusted up or down. The returns for any given hand can be infinitely adjusted. The triggering events themselves—that which causes a pay table to change, whether symbols, sequences of events, successive wins or losses, etc., can be virtually infinite.
6. This invention focuses on the manner in which players are paid. Obviously, this is very important to players. This aspect of gambling games has been largely missed by game developers, who have only come up with limited ways to modify player returns,.especially in video gambling card games.
7. The multiple pay tables offered under this invention permit very fine tuning of a game's expected value. Simple tit-for-tat changes in existing poker pay tables, for example, where a player accepts a lesser return for a hand in one area of the pay table in exchange for a greater return for another hand, are limiting and obvious to players. Using the variable, multiple pay tables of this invention offers virtually infinite adjustment of a game's expected value. Further, any tit-for-tat type changes in the pay tables of this invention can be made much less obvious and virtually opaque to players.
8. This invention can be used as an incentive-producing means for players. That is, it can be used in such a manner as to encourage additional play. The right to play against a heavily escalated pay table offering a greater expected value is something to be sought after!
9. In certain embodiments, this invention can be used as a reward for playing and not paying! Many existing games require greater bets for the possibility of greater returns. This invention can be applied without requiring additional or greater bets.
10. By employing this invention, the pay table and it's expected value can be set to fluctuate considerably. Therefore, it is possible to offer exceptionally high expected values for a short time offset by lower expected values at other times so that the overall expected value remains within a range acceptable to gambling operators. Similarly, individual hand pays can be temporarily set far above industry norms, since they are only available for a limited time, which is exciting and appealing to players.

Further objects and advantages of my invention will become apparent from a consideration of the drawings and ensuing description.

SUMMARY

The present invention offers a set of varying pay tables yielding different expected values in video gambling card games such as electronic video poker, rummy and other games that employ pay tables based on player hand rankings. The present invention has many versions with the common thread being a plurality of pay tables (and their related expected values) occurring as a result of successive wins and losses within successive games, other events or randomly.

DRAWINGS

FIG. 1 is a typical screen display showing five sample pay tables that might occur given three consecutive winning hands followed by a losing hand employing the present invention.

FIG. 2 is a typical screen display showing ten sample pay tables that might occur randomly or based on other events employing the present invention.

FIG. 3 is a typical screen display showing five sample pay tables that might occur randomly or based on other events where individual pays may vary from hand to hand employing the present invention.

FIG. 4 is a typical screen display showing five sample pay tables that might occur randomly or based on other events where the hands themselves are variable using the present invention.

FIG. 5 is a typical screen display showing ten sample pay tables that might occur showing the use of incrementing and decrementing pay tables using the present invention.

DETAILED DESCRIPTION

Preferred Embodiments

A conventional electronic video poker or video slot machine is used to practice the method of the present invention. Said video poker or video slot machine (the "gambling device") usually has electronic computer controls, a coin or note hopper, coin-in handling equipment, currency-in handing equipment (such as a bill acceptor), a video display and other optional equipment such as player tracking apparatus as is conventional. The computer controls are programmed to display and operate the method of the present invention. The pay table is shown on the video display or affixed to the exterior of the gambling device so that it is convenient and conspicuously available to the player.

In the preferred embodiment, this invention is employed with a video poker game. A player wagers on a video draw poker machine. Each successive winning hand (a pay of 1 or more) causes the pay table to escalate as shown in FIG. 1, so that on the next game the player plays for a greater expected value. Upon a losing hand (a pay of 0), or reaching a preset limit in the number of greater pay tables offered, the pay table resets to its starting values. As shown in FIG. 1., if a player bets one coin and gets 4 successive hands of a Straight, Flush, Pair of Queens and Pair of Twos, the pay table escalates 3 times—once for each winner—before resetting to its starting pay table values due to the losing Pair of Twos hand. The Hand #5 pay table shown is a reset pay table, equivalent to the starting Hand #1 pay table. In this embodiment, each game, regardless of the current pay table offered, requires a new wager.

Note there is no requirement that all pays in the pay table must escalate. In the example shown in FIG. 1, losers continue to pay 0 and the Pair of Jacks (or Better) hand continues to pay just 1, while other pays escalate in varying amounts.

This embodiment rewards the player for winning, which is exciting in itself. It is also more involving for the player, since optimal player strategy is changed. Players are encouraged to keep winning and escalate the pay table for the next play.

In another preferred embodiment, the invention is employed in a second-screen poker game on a 5-reel video slot machine. After placing a wager, a player plays a video slot machine. Achieving predefined symbols within the active video display triggers a second-screen feature game. In said feature game, a player plays house-banked video draw poker by traditional rules, but employing the variable pay tables of this invention. Final poker hands are paid according to the current pay table, however, a winning hand allows the player to play draw poker again against a better pay table as shown in FIG. 2. All poker wins are retained and accumulated, and no additional bets are required to participate in successive poker games. When a player loses, however, or reaches a preset limit on the number of poker games allowed, wins, if any, are paid and the player is returned to the originating video slot game. In this embodiment, a maximum of 10 pay tables are possible upon 9 consecutive winning hands until the player plays the 10th and final game of video draw poker. This pay table is heavily escalated and after this 10th game wins are paid (or credited to the player's account), said feature game is over and the player is returned to the originating game to continue video slot play.

This embodiment adds a great deal of excitement to the game. Since no additional wager is required and wins are accumulated, this is very beneficial to the player.

In another preferred embodiment, the variable pay tables of this invention vary randomly from game to game irrespective of consecutive wins, losses or other events. Whether each hand requires a separate wager as in a dedicated video poker or other card game, or whether no wager is required for successive games but only consecutive winners as in a feature game within a video reel slot machine, the pay table varies from game to game as illustrated in FIG. 3. A further variation is shown in FIG. 4. whereby the paying hands themselves vary from game to game. Note that in FIG. 4. a Pair of Eights or Better is a winning hand and certain Four-of-a-Kind hands pay differently.

This embodiment stimulates players by encouraging a different strategy from game to game. This is more thought provoking. Too, players have a chance to earn exceptional returns on the right hands at the right time. Unlike the typical tit-for-tat fixed pay table differences of so many old poker variations, these variable pay tables are constantly changing and dynamic!

DESCRIPTION OF ALTERNATIVE EMBODIMENTS

In another embodiment, other events might cause the variable pay table to reset to its starting value or to a lesser expected value. In video poker, for example, any 4 of a Kind hand or any showing of the Queen of Spades might cause the pay table to reset or decline incrementally as demonstrated in FIG. 5.

In another embodiment, on a video slot machine a reel symbol designated as the Bump symbol might escalate the poker feature pay table one increment even before the poker feature game is triggered. Subsequent Bump symbols would boost it again, even if not occurring in consecutive games, and this could be repeated thereby escalating the pay table. This could continue until a subsequent event or symbol designated as the Reset symbol caused the pay table to return to its starting value. If poker feature was triggered while the poker feature pay table was heavily escalated, this would add great excitement and the possibility of winnings!

In yet another embodiment, there is no additional wager required to play a successive game. Escalated or variable pay table play may be offered as a reward for any previous event or randomly and may be offered as a free play game.

The variable pay table is a new invention that, in most embodiments, entices players to reach new thresholds that are rewarded with a greater expected value and potentially higher winnings in the next game. This adds fun and excitement. The method of obtaining a pay table fluctuation may vary. They may be random, or they may include any number of prior winners, non-winners or other events. In any case, these variable pay tables may replace any fixed pay table, which makes this invention applicable to a great many existing games.

Pay table variation is not merely a linear function of the same pay table award multiplied by the bet as in a typical 1 to 5 coin video poker game, nor does it bear any mathematical relationship to total moneys wagered as in a progressive jackpot. Pay table variation is rarely, if ever, attributable to the amount of the bet, although a minimum or additional wager may or may not be a requirement for pay table variation to occur.

This invention does not require that a pay table does in fact vary from that first offered, if, for example, the triggering event(s) have not occurred. Note too there is no requirement that pay table variations occur on successive games. It may be possible to increment the pay table, play at that escalated level for several games, then increment or decrement the pay table further based on some symbol(s), card(s), event(s) or sequence of events as shown in FIG. 5. Please note that in FIG. 1, FIG. 2, FIG. 3, FIG. 4 and FIG. 5, the pays shown are returns for a 1-credit wager and that greater wagers would be multiplied proportionately to determine actual win amounts.

While the invention has been illustrated with respect to several specific embodiments thereof, these embodiments should be considered as illustrative rather than limiting. Various modifications and additions may be made and will be apparent to those skilled in the art. The variable pay table invention may be offered in any game that uses any form of pay table, or in any such game routine called as part of another game such as a slot machine. The embodiments shown above may be combined to yield even more fascinating games. The pay table awards and/or increments may be fractional. A variable pay table does not have to be limited to a set number of pay tables at all, but may continue indefinitely. Conversely, there may be a limit to the amount of possible pay table variations and escalations.

CONCLUSION, RAMIFICATIONS AND SCOPE OF INVENTION

Accordingly, the reader will see that the variable pay tables of this invention are versatile and can be used as a powerful enhancement to most any video gambling game. The variable pay table adds a great deal of excitement to game play by at times increasing relative returns. The right to play for increasing expected values may be earned by players as a reward for a winning streak, or, alternatively, provided to a player after a bad losing streak! These rewards may be offered without the requirement of a greater or additional bet, so they are beneficial to the player. Escalating pay tables, for example, reward players for playing, not paying!

Too, this invention offers more flexibility in game design and development, since it provides a means for infinitely adjustable expected values. With this invention game expected values can now be fine tuned to a high degree of precision without materially altering the basic rules of underlying game play.

Furthermore, this invention offers random fluctuations in expected value that require changing player strategy to achieve optimum results. This leads to a more engaging and entertaining game and thereby longer playtime, which is a major objective of gambling device operators.

What is claimed is:

1. A method for playing a video gambling game with variable pay features, comprising the steps of:

providing a video gambling game comprising visual display means, payment means, legal tender receiving means and central processing means interconnected to a power source;

inserting legal tender into said legal tender receiving means to activate said video gambling game;

playing a first portion of said video gambling game having a first paytable;

activating subsequent portions and pay tables of said video gambling game by achieving predetermined events in any preceding portion of said video gambling game wherein said subsequent pay tables include factors to be multiplied by the initial wager; and receiving a payment from said payment means if a given result is achieved on said video gambling game.

2. The method of claim 1, wherein said subsequent pay tables increase or decrease in expected value in varying predetermined amounts.

3. The method of claim 1, wherein said subsequent pay tables increase or decrease in expected value randomly within a predetermined plurality of possible pay tables.

4. The method of claim 1, wherein said first pay table is selected randomly from a predetermined plurality of possible pay tables.

5. The method of claim 1, wherein said subsequent pay tables number at least three.

6. The method of claim 1, wherein said first and said subsequent pay tables comprise a means of pay table escalation.

7. The method of claim 1, wherein said video gambling game is a video gambling card game.

8. The method of claim 1, wherein said central processing means comprises a personal computer.

9. A method for playing a video gambling game with variable pay features, comprising the steps of:

providing a video gambling game comprising visual display means, payment means, legal tender receiving means and central processing means interconnected to a power source;

inserting legal tender into said legal tender receiving means to activate said video gambling game;

playing a first portion of said video gambling game having a first pay table selected from a plurality of possible pay tables;

activating subsequent pay tables of said video gambling game by achieving predetermined events in said first portion of video gambling game; and receiving a payment from said payment means if a given result is achieved on said video gambling game.

10. The method of claim 9, wherein said subsequent pay tables increase or decrease in expected value in varying predetermined amounts.

11. The method of claim 9, wherein said subsequent pay tables increase or decrease in expected value randomly within a predetermined plurality of possible pay tables.

12. The method of claim 9, wherein said first pay table is selected randomly from a predetermined plurality of possible pay tables.

13. The method of claim 9, wherein said first pay table is selected by achieving a predetermined event in a game previous to the current game;

14. The method of claim 9, wherein said first pay table is selected by achieving a predetermined event in a plurality of games previous to the current game.

15. The method of claim 9, wherein said subsequent pay tables number at least three.

16. The method of claim 9, wherein said first and said subsequent pay tables comprise a means of pay table escalation.

17. The method of claim 9, wherein said video gambling game is a video gambling card game.

18. The method of claim 9, wherein said central processing means comprises a personal computer.

19. The method of claim 9, wherein said first portion of video gambling game is comprised of any game portion prior to the current portion.

20. A method for playing a video gambling game with a variable pay table, comprising the steps of:

initiating startup of said video gambling game upon receiving a signal acknowledging receipt of a payment means;

running said video gambling game in a first operating mode and providing a visual display of a reward achieved if a first required criteria is accomplished which not include the additional receipt of said payments means;

increasing said reward if a subsequent second required criteria is accomplished which does not include the additional receipt of said payments means; and returning said video gambling game to said first operating mode if said first or said second required criteria is not accomplished, whereby a plurality of pay tables are possible for any given video gambling game providing more flexibility in development, stimulating player interest, enhancing strategy and increasing the overall entertainment value.

* * * * *